Jan. 18, 1966  A. MACOVSKI ET AL  3,230,303
HALF-TONE COLOR DISPLAY GENERATING SYSTEM
Filed July 2, 1962  4 Sheets-Sheet 2
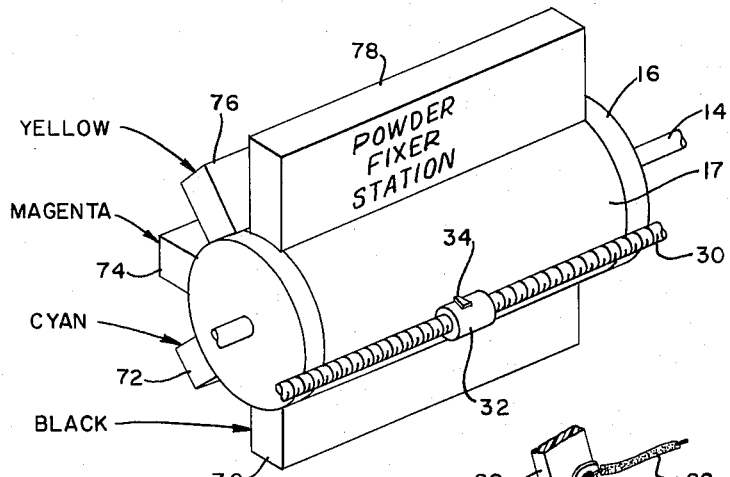
FIG. 2.
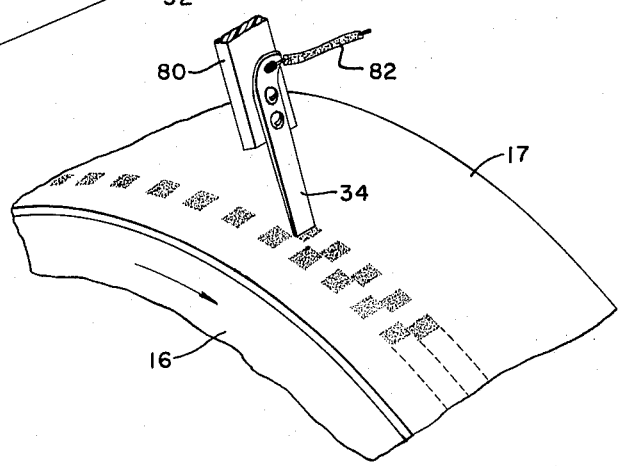
FIG. 3.
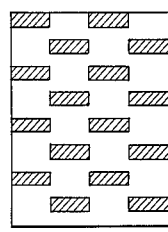
25% COVERAGE
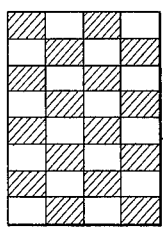
50% COVERAGE
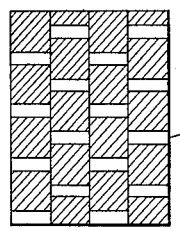
75% COVERAGE
SIZE OF ONE PICTURE ELEMENT
FIG. 4.
ALBERT MACOVSKI
EARLE D. JONES
HUGH F. FROHBACH
DAVID G. REMINGTON
INVENTORS
BY *Lyon+Lyon*
ATTORNEYS

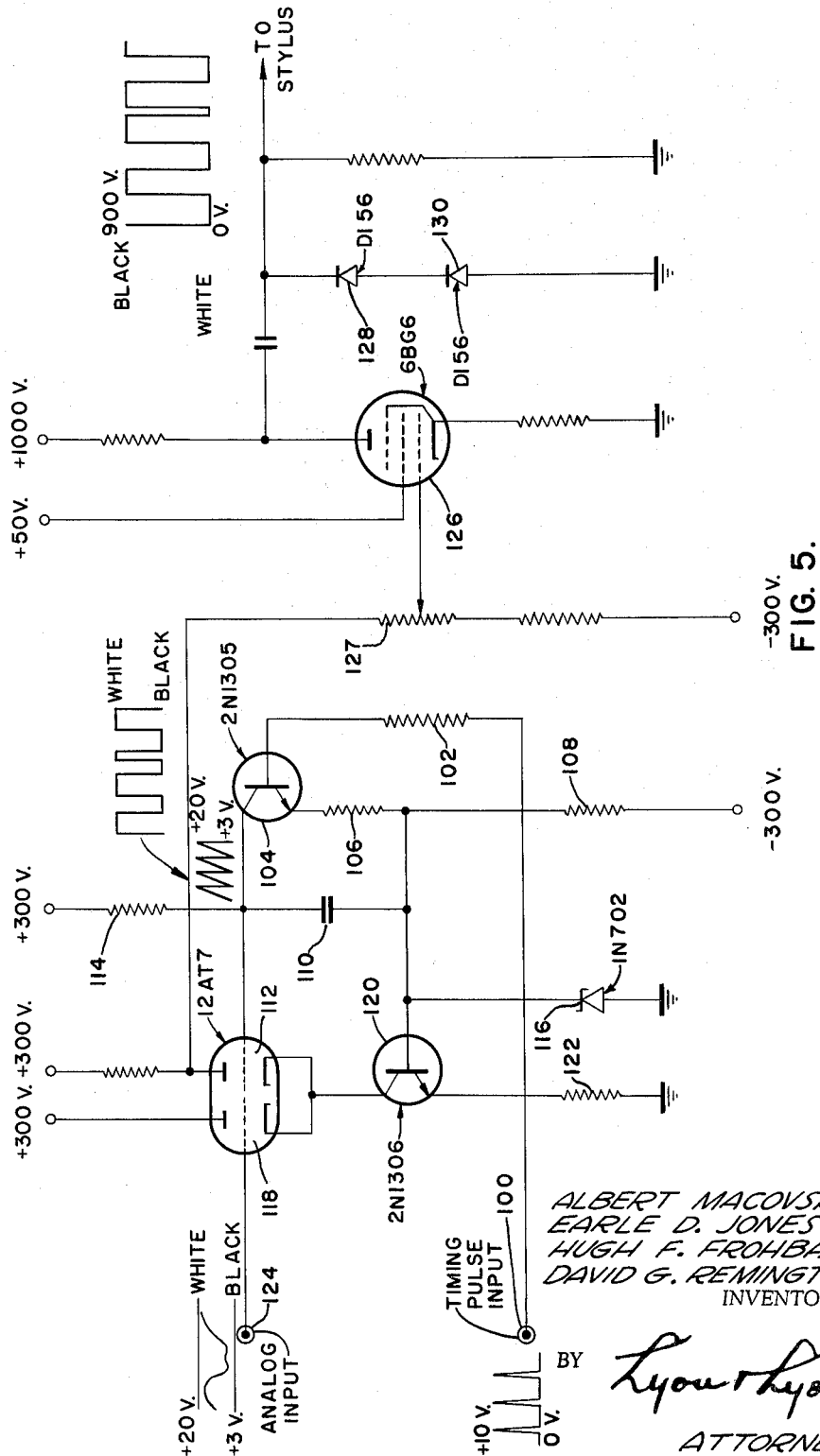

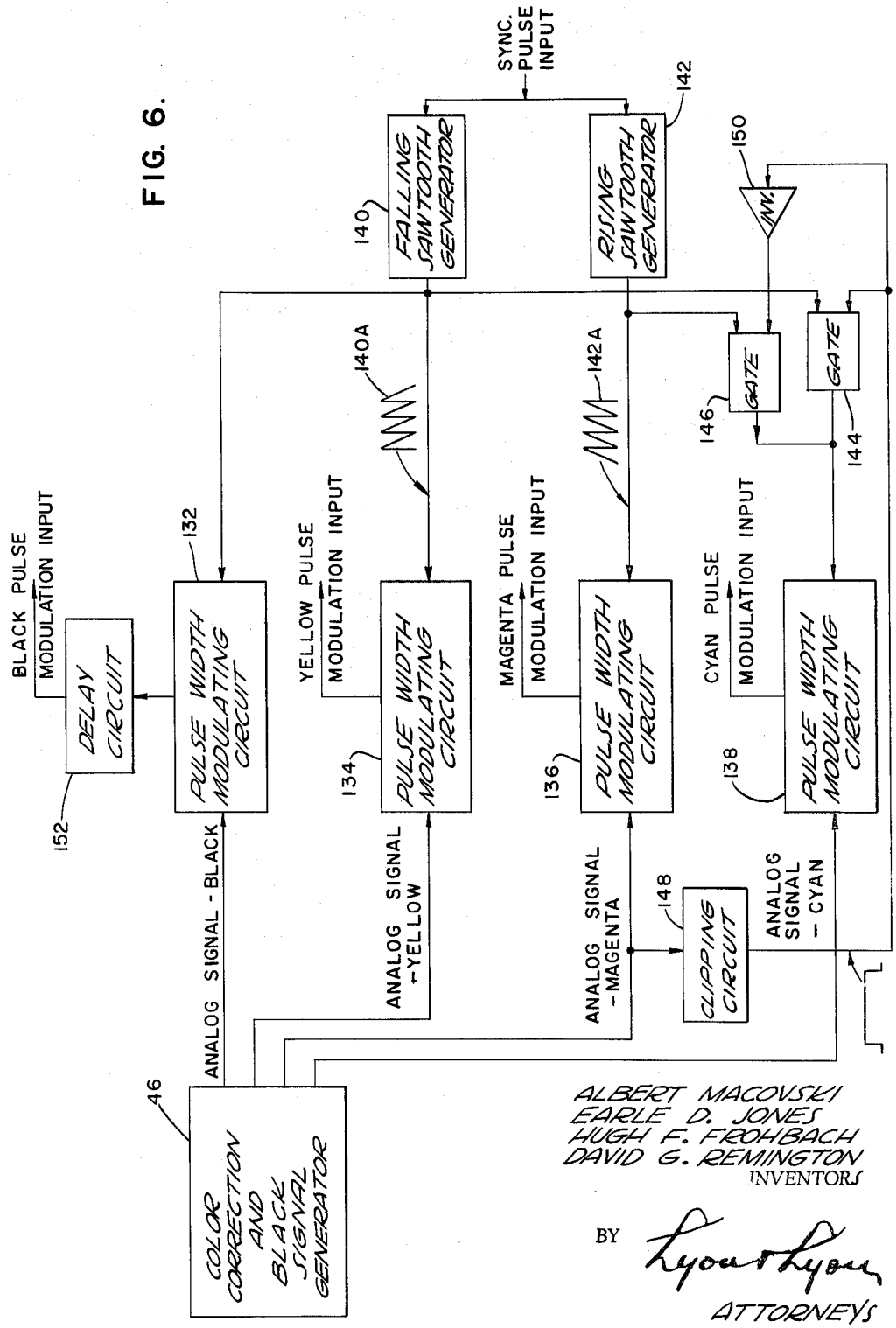

United States Patent Office 3,230,303
Patented Jan. 18, 1966

1

3,230,303
HALF-TONE COLOR DISPLAY GENERATING
SYSTEM
Albert Macovski, Palo Alto, Earle D. Jones, Menlo Park, Hugh F. Frohbach, Sunnyvale, and David G. Remington, Los Gatos, Calif., assignors to Metromedia, Inc., San Francisco, Calif., a corporation of Delaware
Filed July 2, 1962, Ser. No. 206,914
6 Claims. (Cl. 178—5.2)

This invention relates to a system for generating a full color enlargement of a small colored original and, more particularly, to systems employing electrostatic techniques for accomplishing same.

Whenever it is desired to obtain a large-area color display which is derived from a small colored original, one may employ either photographic processes, or one may call for an artist to make a painting. Either technique is costly and time consuming.

An object of this invention is to provide apparatus for making a large-area color display from a colored input copy within a relatively short time.

Another object of this invention is the provision of apparatus for making a large-area color display of a colored original which is less expensive than presently available processes for performing same.

Yet another object of the present invention is the provision of a novel, useful, and unique arrangement for providing a color duplicate of an original copy in color employing electrostatic techniques.

These and other objects of the present invention are achieved in an arrangement wherein, at the outset, electrical signals, representative of the different primary colors in the colored original, are derived from the colored original employing well-known photoelectric techniques. These signals may be applied to a color-correction computer for effectuating masking and for deriving black-representative signals. The output of the computer, consisting of four separate color signals, is applied to four separate pulse-width-modulating circuits, which provide as their output separate width-modulated pulse trains which are the analogs of the amplitude-modulated signals applied to their inputs.

An electrostatic stylus is mounted for scanning output copy in synchronism with the scanning of the input copy. The pulse-width-modulated pulse trains representing the different colors are applied one at a time to the electrostatic stylus. One complete scan of the output copy occurs for each different color. Between scans, the electric charge image for the particular color is developed by dusting the charge image with the pigment powder having the color represented by the charge image and fixing this pigment powder to the copy. As a result, an output copy is obtained which has color and detail corresponding to the original, but whose size may be varied as desired.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 1A is a partial block diagram of another embodiment of the invention;

FIGURE 2 illustrates an arrangement for developing a multicolor electric-charge image;

FIGURE 3 illustrates a stylus suitable for use in this invention;

2

Figure 1:
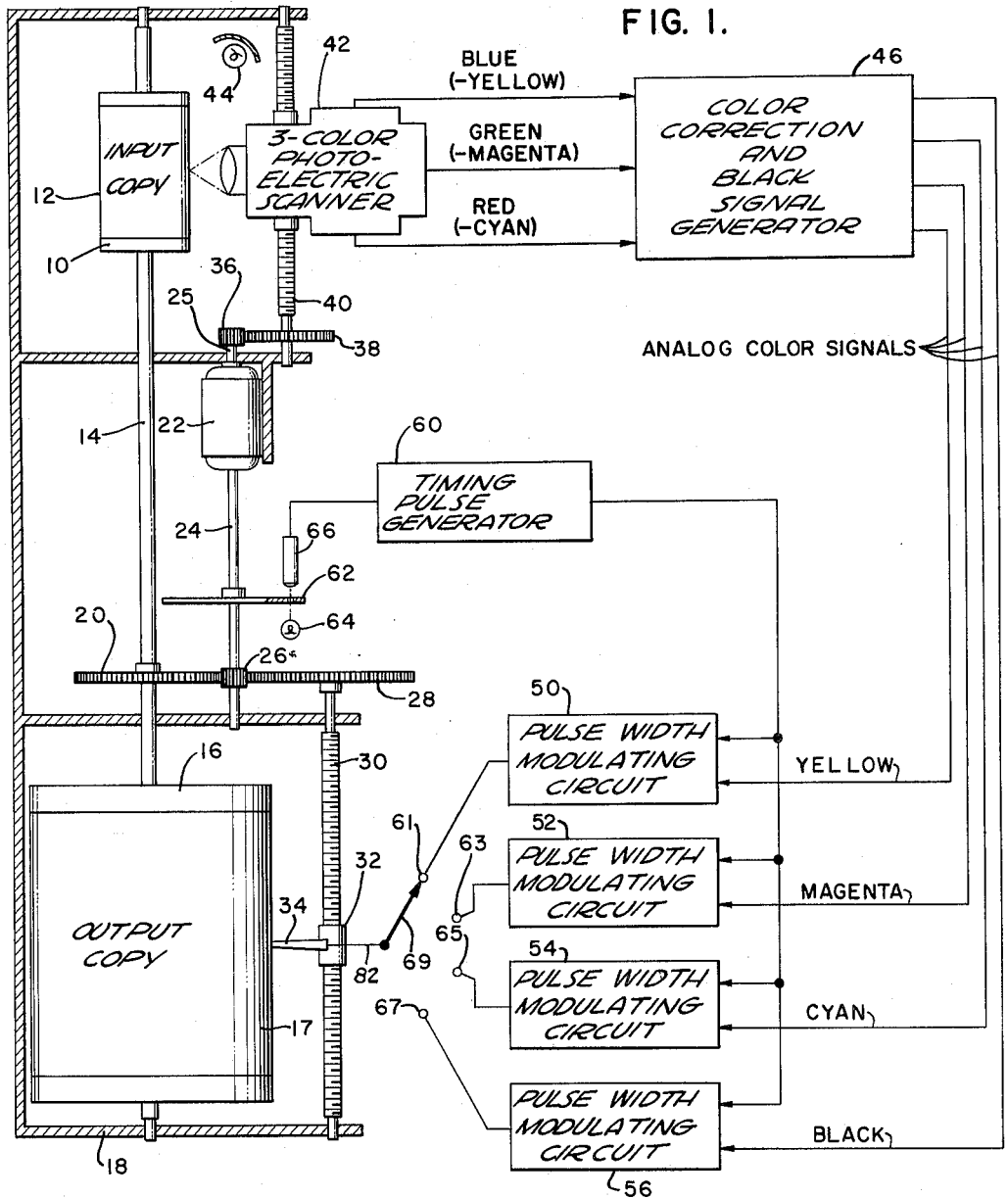
FIGURE 1 is a block-schematic diagram of an embodiment of the invention.

FIGURE 4 illustrates picture-element patterns as obtained with this invention;

FIGURE 5 is a circuit diagram of a pulse-width-modulating circuit suitable for use with the embodiment of the invention; and FIGURE 6 is a block diagram illustrating an arrangement for depositing electric-charge patterns of different colors within a picture element.

Reference is now made to FIGURE 1, which is a block-schematic diagram showing an embodiment of the invention. This includes a first drum 10, on which input copy 12 is mounted. The drum 10 is supported on a rotatably driven shaft 14. The shaft 14 extends to support thereon a large drum 16, on which is attached dielectric paper 17 on which output copy is to be printed. The shaft 14 is rotatably supported on a suitable base 18. A first driven gear 20 is mounted on the shaft 14, to be rotatable therewith. A drive motor 22 drives a shaft 24, on which is mounted a drive gear 26. The drive gear 26 engages the driven gear 20 and a second driven gear 28.

The second driven gear 28, in being driven, rotates a threaded shaft 30. The threaded shaft is also supported in the housing support 18. Mounted on the threaded shaft 30 is a carriage 32, including therein a traveling nut which is threaded so that, as the threaded shaft 30 rotates, the carriage travels therealong. The carriage 32 carries an electrostatic-writing stylus 34, details of which are shown in FIGURE 3.

An extension 25 of the shaft 24 of the drive motor 22 has a second driving gear 36 mounted thereon. This driving gear 36 rotatably drives a third driven gear 38. The third driven gear 38 is mounted upon a threaded shaft 40. A three-color photoelectric scanner 42 is supported on the threaded shaft 40 in a manner so that, as the shaft is rotated by the gear 38, the three-color photoelectric scanner 42 traverses the shaft. A light 44 is used to illuminate the input copy.

The mechanism described thus far is an arrangement for rotating the drums 10 and 16 together and for synchronously scanning the input copy with the three-color photoelectric scanner 42 and the output copy with the electrostatic stylus 34. This is desirable since, as will be shown later, it is necessary to scan both input and output copy as many times as there are different primary colors to be deposited on the output copy. The arrangement shown is used in order to maintain the proper aspect ratio between input and output copy.

The three-color photoelectric scanner 42 comprises any well-known photoelectric apparatus for generating three electrical signals, respectively representative of blue, green, and red colors, on the input copy 12, being scanned. The three separate color signals of the photoelectric scanner output are applied to a color-correction signal generator 46. Since it is unlikely that the spectral characteristics of filters will match, even approximately, the complement of the spectral characteristics of available toner pigments to be used on the output copy, it is necessary to employ some color-correction, or masking technique. This is the function of the color-correction signal generator. There are a variety of different known systems which are described in the literature on color printing, which vary in complexity from simple, linear, algebraic combinations of the three input signals, which give an accurate color match at the primary pigment colors, to highly specialized circuits, which insure accurate color matching at eight color points, or more. Any of these, which are able to respond at speeds up to the picture element rate, are suitable for use in this system. In addition to providing color-correction signals, the generator 46 can also include conventional circuitry for simulating under-color removal to generate a signal for the black pigment and to remove this component from the three color signals. This process is also conventional and consists of stripping the portions of the signal common to all three colors from each of them and replacing it with a black signal.

In order to preserve grey scale relationships, it is necessary to have a linear transfer function between the amount of color called for by the electrical output of the color-correction computer and the density of the pigment to be applied at the output copy. It has been found that simply varying the electrical potential of a charge-depositing stylus linearly does not result in a linearly varying density of pigment coverage obtained after development. Furthermore, the results are not very reproducible, since the curve of toner pigment coverage versus stylus potential varies from time to time, depending on humidity, temperature, and stylus pressure, as well as other uncontrollable quantities. For this reason, the present invention applies a technique, which demands only that below a threshold value, the stylus deposits no charge, and, above a threshold value, the stylus deposits sufficient charge to give essentially total pigment coverage, when developed. Grey scale is obtained by varying the ratio of the area totally covered to the area with no coverage within each picture element, similar in some respects to the half-tone process used in printing.

In accordance with this invention, the signals to be applied to the stylus are in the form of rectangular voltage pulses. The repetition rate of the pulses is such that the surface of the drum will move the distance of one picture element between leading edges of each pulse. The time duration of each pulse is determined in accordance with the density of pigment deposition called for by the color-processing circuitry. For lightly pigmented areas of the picture, the applied pulses are of very short duration, and, for heavily pigmented areas, the pulse duration may approach or become equal to the pulse period. In this manner, the area allotted to each picture element becomes a small rectangle (or square), partially filled in to a distance from one edge which is controlled by the density required at that element.

Each different analog color-signal output of the color-correction signal generator 46 is applied to a separate pulse-width-modulating circuit, respectively 50, 52, 54, 56. The respective yellow, magenta, cyan, and black analog signals are respectively applied to the pulse-width-modulating circuits 50, 52, 54, 56. Also applied to these circuits is the output of a timing-pulse generator 60. The timing-pulse generator derives initiating signals from an arrangement comprising a timing wheel 62, which is mounted on the shaft 24, to be rotatable therewith. The wheel has apertures equally spaced around the periphery. Thus, as the wheel rotates, light from the lamp 64 can reach the photocell 66 through these apertures. The output of the respective pulse-width-modulating circuits 50, 52, 54, 56 are connected to the respective terminals 61, 63, 65, 67 of a selector switch 69. The selector-switch output is connected to the writing stylus 34.

In operation, the input copy 12 is mounted on the drum 10; the output copy 17 is mounted on the drum 16. The drive motor is excited to drive the three-color photoelectric scanner and the stylus to one end of the respective lead screws, on which they are mounted. The selector switch 68 is then connected to whichever one of the pulse-width-modulator circuits, corresponding to the color, is desired to be developed out first. The drive motor is then started, and an electrostatic-charge deposition will occur on the output copy, in accordance with the presence or absence of a pulse, as well as the duration of the pulse which is applied thereto. The motor 22 at the end of one complete scanning process, is then reversed, until the three-color photoelectric scanner and the writing stylus are back in the starting positions again. The selector switch is moved to select the next color signal. The scanning process by the three-color photoelectric scanner and the electrostatic-writing process by the stylus 34 are again permitted to occur. This is repeated for each different color.

As shown in FIGURE 1A, it is possible to operate the system shown in FIGURE 1 with a single pulse-width-modulating circuit 57, which has its output directly connected to the transducer 34 and its input connected, in turn, by means of a selector switch 59 to each different one of the color-signal outputs of the color-correction and black-signal generator. A second input to the pulse-width-modulating circuit 57 would be the output of the timing-pulse generator. The sequence of operations would be the same as has been described for the arrangement shown in FIGURE 1. That is, a complete scan of the original is made for a color; the apparatus is reset; the selector switch 59 is moved to select the next output from the color-correction computer; and another scanning operation is performed. This is continued until all colors have been laid down on the copy.

As shown in FIGURE 2, there may be provided, adjacent the drum 16, a different toner-powder box, respectively 70, 72, 74, 76, for the respective colors black, cyan, magenta, and yellow. When the selector switch 69 is connected to the terminal 61, so that a yellow-color-representative-signal pulse train is applied to the stylus, the contents of box 76 are applied to dust the surface of the output copy with yellow toner powder, which adheres to the regions on the surface of the copy which have received the electric charge. A powder-fixing station 78, which may include a heater, serves to fix the powder onto the output copy. When the selector switch 69 is connected to the terminal 63, the stylus 30 will deposit electric charges in accordance with the magenta color to be reproduced. At this time, the powder-dusting box 74 is opened, and the other boxes are closed. It should thus be apparent how the embodiment of the invention is used to successively lay down a different charge pattern and to then successively develop the different charge patterns by dusting with the toner powder, having a color corresponding to the signals which deposited the charge pattern, and fixing these charge patterns.

FIGURE 3 is an isometric view illustrating the type of metal stylus which is employed with the embodiment of the invention for laying down a charge which is thinner than the size of one picture element, but precisely one picture element in width. There is an insulating support 80, which is attached to the carriage 32, which effectively may be a traveling nut mounted upon the lead screw 30. The metal stylus 34 is a thin, rectangular piece of metal, which has one end in contact with the surface of the drum and the other end attached to the insulating support 80. A wire lead 82 is connected to the stylus 34. This wire lead has its other end connected to the selector switch 69. The output copy 17 consists of a dielectric-coated paper, which is mounted on the drum surface 16. The drum surface is made of conductive metal.

It was previously pointed out that synchronization of the timing pulses with the rotation of the respective drums 10 and 16 is obtained by means of a timing wheel 62, directly geared to the drum and having a number of evenly spaced holes at a fixed radius from its center, through which light passes to excite a photocell 66. Since the timing wheel is directly geared to the drum, the pulses always occur at discrete rotational positions of the drum. If the number of timing holes which pass before the photocell during one drum revolution is chosen to be on the order of $$\frac{2n+1}{2}$$

where "$n$" is an integer, then, during each revolution of the drum, the element rectangles will be displaced a distance of one-half of a picture element, with respect to the previous scan. This has the important advantage of giving the broad areas of uniform density the appearance of a "checkerboard," rather than the appearance of undesirable stripes, which would result if adjacent scans had their picture-element rectangles in alignment.

Reference is now made to FIGURE 4, which shows the appearance of the picture elements. By way of illustration, the rectangle 84 represents the size of one picture element. The patterns enclosed in the respective rectangles 86, 88, and 90 respectively represent 25 percent picture-element coverage, 50 percent picture-element coverage, and 75 percent picture-element coverage. The rectangular structure of the individual picture elements is not discernible to the eye, when viewed from a distance exceeding approximately 2000 times the size of one picture element. For example, if the individual elements are one-eighth inch in size, they are not visible when viewed from a distance exceeding twenty feet; thus, the uniform checkerboard pattern appears as a uniform shade of the pigment color.

Accurate registration between the several pigment colors used is maintained by simply leaving the paper firmly affixed to the drum in the manner described until all of the colors have been developed and fixed.

FIGURE 5 is a circuit diagram of a pulse-width-modulating circuit which receives timing pulses and analog signals representative of color intensity and converts these to a pulse train, wherein the width of each pulse represents the amplitude of the analog input signal. One or these circuits is required for each of the pulse-width-modulating circuits 50, 52, 54, 56. Timing pulses are applied to an input terminal 10, which is connected through a resistor 102 to the base of a transistor 104. The emitter of the transistor 104 is connected through two series-connected resistors, respectively 106, 108, to a source of operating potential, on the order of —300 volts. Between the junction of the resistors 106 and 108 and the collector of transistor 104 is a capacitor 110. The collector of transistor 104 is connected to the control grid of the tube 112 and through a resistor 114 to a source of operating potential, which is on the order of +300 volts. The capacitor 110 is connected to ground through a Zener diode 116. The capacitor 110 thus has a charging path. It is then discharged when a timing pulse from the terminal 100 renders the transistor 104 conductive.

The charge-discharge action of the capacitor generates sawtooth waves which are applied to the control grid of the tube 112. Tube 112 has a common-cathode connection with a tube 118. The common cathode is connected to the collector of a transistor 120. The transistor base is connected to the junction of the two resistors 106, 108, and its emitter is connected to ground through a resistor 122. The analog signal representative of a color is applied to a terminal 124, which is connected to the control grid of the tube 118.

The output signal, which is derived from the anode of tube 112, is the amplified difference between the signal input to the control grid of tube 118 and the signal input to the control grid of tube 112. This difference signal is applied to a potentiometer 128. The potentiometer 128 is connected to the control grid of a high-gain amplifier tube 126, which is connected over a resistor 127 to the anode of tube 112. Tube 126 inverts the signal applied to its control grid and applies its output to clamping circuitry, including series-connected diodes 128 and 130, which clamps the signal to zero potential. The output signals have an amplitude on the order of 900 volts. This output is applied to one of the terminals of the selector switch 69, which, in turn, applies this output to the stylus.

A method for minimizing the amount of overlap of the deposited colors in the system thus far described is to utilize the position with which the picture-element positions are determined. For any one color, it makes no difference whether the picture-element rectangles are filled in, starting from the leading edge or the trailing edge of the rectangle assigned to the element. The pulse-width-modulating circuitry may be easily arranged so that either the leading or trailing edges of the pulses coincide with the reference positions as signaled by the timing wheel. Thus, the first color may be assigned the first portion of the element rectangles, and the second color may be assigned the last portion. Further, it is characteristic in the three colors, plus black, process that the output of the undercolor removal circuit consists of only two of the three colors, plus black at any one instant. Advantage may be taken of this fact in assigning a position to the third color. That is, if the third color is called for, then one of the two previous colors is absent, and the third color may be placed in the unoccupied position of the element rectangle. The location to which the black signal is applied is not critical, since it is not directly involved in the color-adding process. One way of adding the color black is to index over the start of each element a distance of one-half of a picture element, such that small black areas will be in the center of the previous elements. Large black areas can exist only in regions of no color, such that overlapped color and black should not be a serious problem.

FIGURE 6 is a block diagram of an arrangement for providing the functions described. The color-correction and black-signal generator 46 provides four analog signals, respectively representative of black, yellow, magenta, and cyan. Each one of these output signals is applied to a separate pulse-width-modulating circuit, respectively 132, 134, 136, and 138. Actually, in this particular circuit, the pulse-width-modulating circuit comprises a difference amplifier of the type exemplified in FIGURE 5, including the tubes 112 and 118 and the following inverter tube 126 and clamping circuit. Two separate sawtooth generators, respectively 140 and 142, are required. One of these is designated as a falling sawtooth generator, and it provides an output signal having the waveform 140A. Here, the vertical portion of each "saw" occurs first, and the sloping portion occurs second. The rising sawtooth generator 142 provides an output having the waveform 142A. Here, the sloping portion of the saw occurs first, and the vertical portion occurs second. Both sawtooth generators are synchronized from the sync-pulse output received from the timing wheel. Circuits for obtaining the waveforms 140A and 142A are well known. The circuit for obtaining the waveform 142A is shown in FIGURE 5. The circuit for obtaining the waveform 140A can comprise a Miller integrator circuit, or falling-ramp generator.

The falling sawtooth generator output is applied to the pulse-width-modulating circuit 132 for black signals, to the pulse-width-modulating circuit 134 for yellow signals, and as one input to a coincidence gate 144. The output of the rising sawtooth generator 142 is applied as a second input to the pulse-width-modulating circuit 136 for the magenta signals and as one of the two required inputs to a second coincidence gate 146. The outputs of both gates 144 and 146 are applied to the pulse-width-modulating circuit 138 for the cyan signals. The magenta analog signal, besides being applied to its associated pulse-width-modulating circuit 136, is also applied to a clipping circuit 148. The clipping circuit is merely a diode, which is biased to clip any input signal at roughly ten percent of the full amplitude. The output of the clipping circuit is applied as a second required input to the gate 144 and also to an inverter circuit 150. The inverter consists of an amplifier, whose output is applied to the gate 146 for the purpose of inhibiting any output from the gate for the duration of the output of the inverter 150.

A yellow analog-signal output from the generator 46 is pulse-width modulated and deposited over the first, or leading, portion of the designated picture element, in view of the "falling" sawtooth shape. Any magenta analog signal received as an output from the generator 46 is pulse-width modulated and deposited as charge over the trailing portion of a picture-element area, in view of the rising sawtooth shape, which delays the leading edge of the pulses for the requisite interval. The black analog signal is pulse-width modulated. The output of the pulse-width-modulating circuit 132 is applied to a delay line 152. Since one input to the pulse-width-modulating circuit 132 is the falling sawtooth generator output, without further modification the black signal charge would be deposited over the leading edge of a picture element. However, the delay circuit 152 is employed for delaying the occurrence of the black-pulse signal until substantially the center of a picture element is reached by the drum, which is continuously rotating.

In the presence of a magenta signal, gate 144 is enabled and can apply the output of the falling sawtooth generator to one input of the pulse-width-modulating circuit 138. Thus, the cyan-representative pulses will occur in the presence of magenta over the leading portion of each picture element of the material, while the magenta is deposited at the trailing portion of the picture element. The presence of the magenta signal also serves to inhibit gate 146. In the presence of a yellow signal, gate 146 is opened and gate 144 is closed. Accordingly, the rising sawtooth generator output is applied to the pulse-width-modulating circuit 138, and the cyan signal will occur over the trailing portion of a picture element while the yellow signal will occur over the leading portion of the picture element. The technique minimizes the amount of overlapping of pigment areas.

The electrostatic technique for charge deposition and development is quite well known, and therefore it is believed that a specific description thereof is not required. As previously indicated, a pulse in any one of the pulse trains applied to the stylus has an amplitude sufficient to cause a charge deposition on the surface of the copy 17 on the conducting drum 16. When there is no pulse applied to the stylus, no charge deposition occurs. The scanning process is repeated for each of the colors which are employed, so that the finally resulting output copy closely resembles the input in shading and hue but is considerably enlarged. The intensity of a color is represented by the width of a pulse. Thus, a grey-scale effect is obtained by varying the ratio of the area totally covered by a pigment to the area with no coverage within each picture element.

There has accordingly been described and shown herein a novel, useful, inexpensive, and rapid system for reproducing a color copy of an original colored picture. The size of the copy is limited only by the size of the output drum around which the dielectric paper, on which the electric charges are placed, is wrapped. Those skilled in the art will appreciate that, although the reproduction system herein has been described for the reproduction of colored copies of an original in color, the system can also be used for reproducing a black-and-white copy in black and white, reproducing shades of grey by the width of the areas as covered in the manner described. Thus, the invention should not be construed as being limited to color reproductions only, but is capable of reproducing black-and-white reproductions with the varying shades of grey. Of course, for using the embodiment of the invention for black-and-white reproduction, only a scan of the original is required. The color-correction computer is not required. Signals derived from the scanning mechanism, representative of the tones of the original, may be applied directly to the pulse-width circuitry, and the output of this circuitry is directly connected to the writing transducer. Black-pigment powder is applied to the latent electrostatic image in response to the width-modulated pulses. The powder is then fixed in the manner well known in the Xerographic art.

We claim:

1. Apparatus for making a copy in color of a colored original comprising an electrostatic transducer, means for successively scanning picture elements in said original while traversing picture-element areas of said copy with said electrostatic transducer, means responsive to said means for scanning to generate a separate pulse signal for each elementary color in each picture element, each said separate pulse signal having its width representative of the elementary color saturation of said picture element, means for applying to said electrostatic transducer separately said pulse signals for each color for depositing electric charges over a portion of each picture element area of said copy corresponding to the width of each pulse signal, and means for developing said electric charges.

2. Apparatus for making a copy in color of a colored original comprising means for successively scanning picture elements in said original for generating for each color a separate train of amplitude-modulated signals representative of the color saturation of said picture elements, an electrostatic transducer, means for successively traversing picture-element areas of said copy with said electrostatic transducer substantially synchronously with the successive scanning of each said picture element on said original, means for converting each train of said amplitude-modulated signals to a corresponding train of pulse-width-modulated signals, means for applying each train of pulse-width modulated signals in turn to said electrostatic transducer to deposit an electric-charge pattern in each picture element area of said copy while the corresponding picture element of said original is being scanned, and means for developing the electric-charge pattern for each color in turn immediately after the charge pattern representative of the color in the original has been deposited on said dielectric-writing medium.

3. Apparatus for making a copy in color of a colored original comprising means for successively scanning picture elements in said original for generating a separate train of amplitude-modulated signals for each color representative of the color saturation of said picture elements, an electrostatic transducer, a dielectric-writing medium, means for successively traversing picture-element areas of said dielectric-writing medium with said electrostatic transducer substantially synchronously with the successive scanning of each said picture element on said original, means for deriving a timing pulse for each of said picture elements, means to which said timing pulses are applied for separately converting each said amplitude-modulated signal train to a separate pulse-width-modulated signal train, switch means connected to the output of all said means for converting for selecting a different one of said pulse-width-modulated signal trains, means for applying the output of said switch means to said electrostatic transducer to deposit an electric charge in each picture-element area of said dielectric material over a portion of said picture-element area corresponding to the amplitude of the signal derived from the color in the corresponding picture element of said colored original, and means for developing in color the electric-charge patterns which are deposited.

4. Apparatus as recited in claim 3 wherein the electrostatic transducer comprises a substantially rectangular conductive metal strip having a width substantially equal to the width of a picture-element area and being thin relative to the length of a picture-element area.

5. Apparatus for making a copy in color of a colored original as recited in claim 3 wherein the means for applying each train of pulse-width-modulated signals in turn to said electrostatic transducer includes means for establishing the pulses in the pulse-width-modulated signals derived as a result of the presence of a first color in the original substantially coincident with the passage of the first-half portion of a picture-element area in said copy under said transducer, means for establishing the pulses in the pulse-width-modulated signals derived as a result of the presence of a second color in the original substantially coincident with the passage of the last-half portion of a picture-element area in said copy under said transducer, and means for establishing the pulses in the pulse-width-modulated signals derived as a result of the presence of a third color in the original substantially coincident with the passage of the first-half portion of a picture-element area under said transducer in the absence of said first color and substantially coincident with the passage of the last-half portion of a picture-element area under said transducer in the absence of said second color.

6. Apparatus for making a copy in color of a colored original comprising means for successively scanning picture elements in said original for generating for each color a separate train of amplitude-modulated signals representative of the color saturation of said picture elements, an electrostatic transducer, means for successively traversing picture-element areas of said copy with said electrostatic transducer substantially synchronously with the successive scanning of each said picture element on said original, means for converting each train of said amplitude-modulated signals to a corresponding train of pulse width modulated signals, said last named means including means for establishing the leading edge of a pulse associated with a first color delayed with respect to the leading edge of a pulse associated with said color by the time taken to traverse substantially one-half of a picture element, and means to establish the leading edge of a pulse associated with a third color at the time allotted to the leading edge of the pulse associated with the missing one of said first and second colors; means for applying each train of pulse width modulated signals in turn to said electrostatic transducer to deposit an electric-charge pattern in each picture element area of said copy while the corresponding picture element of said original is being scanned, and means for developing the electric-charge pattern for each color in turn immediately after the charge pattern representative of the color in the original has been deposited on said dielectric writing medium.

References Cited by the Examiner

UNITED STATES PATENTS

| | | | |
|---|---|---|---|
| 1,190,095 | 7/1916 | Boubnoff | 178—5.2 |
| 2,434,561 | 1/1948 | Hardy et al. | 178—5.2 |
| 2,510,121 | 6/1950 | Lehman et al. | 178—6.6 |
| 2,572,550 | 10/1951 | White et al. | 178—5.2 X |
| 2,924,653 | 2/1960 | Fairchild | 178—6.6 |
| 2,976,354 | 3/1961 | Banning et al. | 178—6.6 |
| 2,986,466 | 5/1961 | Kaprelian | 178—5.2 |

FOREIGN PATENTS

| | | |
|---|---|---|
| 1,073,866 | 1/1960 | Germany. |

DAVID G. REDINBAUGH, *Primary Examiner.*

ROBERT SEGAL, *Examiner.*